(12) United States Patent
von dem Esche et al.

(10) Patent No.: US 9,859,711 B2
(45) Date of Patent: Jan. 2, 2018

(54) ENERGY STORAGE SYSTEM AND MODULAR COMMUNICATION

(71) Applicant: ENRICHMENT TECHNOLOGY COMPANY LTD., Jülich (DE)

(72) Inventors: Rainer von dem Esche, Heinsberg (DE); Christoph Schäfer, Aachen (DE); Christoph Treppmann, Aachen (DE)

(73) Assignee: Enrichment Technology Company Ltd. (DE)

( * ) Notice: Subject to any disclaimer, the term of this patent is extended or adjusted under 35 U.S.C. 154(b) by 301 days.

(21) Appl. No.: 14/430,498

(22) PCT Filed: Sep. 10, 2013

(86) PCT No.: PCT/EP2013/068718
§ 371 (c)(1),
(2) Date: Jul. 24, 2015

(87) PCT Pub. No.: WO2014/048725
PCT Pub. Date: Apr. 3, 2014

(65) Prior Publication Data
US 2015/0349531 A1   Dec. 3, 2015

(30) Foreign Application Priority Data

Sep. 28, 2012 (EP) ................................... 12186464

(51) Int. Cl.
*H02J 3/24* (2006.01)
*H02J 3/00* (2006.01)
(Continued)

(52) U.S. Cl.
CPC ............... *H02J 3/24* (2013.01); *H02J 3/005* (2013.01); *H02J 3/30* (2013.01); *H02J 3/382* (2013.01); *Y02E 60/16* (2013.01); *Y10T 307/32* (2015.04)

(58) Field of Classification Search
CPC .............................. Y10T 307/32; H02J 3/24
(Continued)

(56) References Cited

U.S. PATENT DOCUMENTS

| | | | |
|---|---|---|---|
| 8,008,804 B2 * | 8/2011 | Capp ..................... | H02J 3/30 307/44 |
| 2004/0263116 A1 * | 12/2004 | Doruk .................... | F01K 13/00 320/107 |
| 2010/0332042 A1 * | 12/2010 | Riesberg ............... | F03D 7/0284 700/287 |

FOREIGN PATENT DOCUMENTS

| | | | | |
|---|---|---|---|---|
| DE | 10 2008 037 575 A1 | 7/2010 | | |
| DE | 102008037575 A1 * | 7/2010 | .......... | B60L 11/1824 |

(Continued)

OTHER PUBLICATIONS

International Search Report for corresponding PCT/EP2013/068718, completed Jul. 31, 2014 by C. Gatzert.
(Continued)

*Primary Examiner* — Rexford Barnie
*Assistant Examiner* — Joseph Inge
(74) *Attorney, Agent, or Firm* — Tarolli, Sundheim, Covell & Tummino LLP

(57) ABSTRACT

An energy storage system is provided that is adapted to simultaneously carry out control and system tasks in non-local and local power supply grids and to a method for operating such an energy supply system. The energy storage system has a modular structure and comprises more than one energy storage modules that are connected to each other via data lines. One of the energy storage modules is provided as
(Continued)

master module and the others are provided as slave modules and the master module is configured for the overall control of all energy storage modules connected to the data line. At least the master module comprises at least one interface for receiving external control commands regarding the localized and non-localized control and system tasks to be carried out and a master control unit for storing and carrying out the external control commands.

16 Claims, 5 Drawing Sheets

(51) Int. Cl.
    *H02J 3/38*     (2006.01)
    *H02J 3/30*     (2006.01)

(58) Field of Classification Search
    USPC .......................................................... 307/20
    See application file for complete search history.

(56) References Cited

FOREIGN PATENT DOCUMENTS

| DE | 10 2009 020 178 A1 | 11/2010 |
|---|---|---|
| EP | 2 267 302 A2 | 12/2010 |

OTHER PUBLICATIONS

Kim, et al.: "*Dynamic Modeling and Control of a Grid-Connected Hybrid Generation System with Versatile Power Transfer*"; IEEE Transactions on Industrial Electronics, IEEE Service Center, Piscataway, NJ, USA, vol. 55, No. 4, Apr. 1, 2008, pp. 1677-1688, XP011202591; ISSN: 0278-0046 (whole document).

\* cited by examiner

ENERGY STORAGE SYSTEM AND MODULAR COMMUNICATION

RELATED APPLICATIONS

The present invention is a U.S. National Stage under 35 USC 371 patent application, claiming priority to Serial No. PCT/EP2013/068718, filed on 10 Sep. 2013; which claims priority from Ep 12186464.9, filed 28 Sep. 2012, the entirety of both of which are incorporated herein by reference.

FIELD OF THE INVENTION

The invention relates to an energy storage system that is adapted to simultaneously carry out control and system tasks in non-local and local power supply grids, to a master module for use in such an energy storage system, and to a method for operating such an energy storage system.

BACKGROUND OF THE INVENTION

The energy for operating a power supply grid is supplied by various and different types of power stations. Herein, most of the power stations, such as nuclear power stations, coal-fired power stations, gas-fired power stations, wind turbines, biogas plants, or solar power plants, are nothing but energy generators for feeding energy into the non-local power supply grid. For example, non-local power supply grids are distribution networks and transmission networks, such as they are operated in Germany by Amprion, 50 Hertz, Tennet, and TransnetEnBW. These transmission networks are a part of the wide area synchronous grid in Europe. In their capacity as mere energy generators, the power stations mentioned above cannot take up any extra energy from the grid and store it in case of need. In contrast, energy storage systems can be used to absorb energy from and release it to a power supply grid. For example, energy storage systems are central energy storage systems, such as pumped storage power stations, or decentralized energy storage systems, such as battery storage devices or flywheel energy storage units. Pumped storage power stations are energy storage systems that are largely not subject to changes in weather and, as a general rule, are therefore always available. Usually, central energy storage systems are designed for a large capacity. Due to the available capacity, such systems are adapted to provide reserve energy for the non-local power supply grid in order to take appropriate effect in the non-local power supply grid. Depending on their overall size, pumped storage power stations may have a capacity of several 100 MW and more wherein, however, the generators are, in most cases, designed to produce electric current under full load and can therefore utilize the full capacity of the pumped storage power station at an appropriate efficiency and in a timely manner. This operating method is not adapted to stabilize or improve the quality of a small local power supply systems having a demand for electricity that is rather negligible as compared with the capacity of the pumped storage power station.

Centrally used battery storage devices are currently under construction with the objective to put into practice a pilot operating method for grid-stabilizing (non-localized) tasks (reserve energy). However, the devices that have been planned so far do not fulfill any localized tasks. Due to their immanent relationships between output, capacity and aging, however, battery storage devices are, as a matter of principle, not very well suited for such applications with a plurality of load cycles per day and degrade rapidly because of temperature influences, system failures and operating errors. For this reason, battery storage devices require highly intensive maintenance. Due to their high fire and chemical risks, battery storage devices additionally present an environmental and/or water hazard and are highly complex in terms of protection and security.

In general, decentralized energy storage systems are optimized for stabilizing the local demand for electricity and are neither designed nor qualified for delivering reserve energy to support the non-local power supply grid. Such systems cannot contribute to fulfilling the demands of all power supply grids. An interconnection of the decentralized storage systems to form a system that is operated both locally and non-locally has not been achieved so far.

For this reason, it would be desirable to have an effective energy storage system available which allows achieving an improvement in the quality of local grids and, at the same time, the security of energy supplies for non-local power supply grids as required and can therefore be operated as an energy storage system having an adequate effect for both purposes.

SUMMARY OF THE INVENTION

It is an object of the present invention to provide an effective energy storage system which allows achieving an improvement in the quality of local grids and, at the same time, the security of energy supplies for non-local power supply grids as required.

This problem is solved by an energy storage system having a system storage capacity and/or system output and having more than one of energy storage modules each having a module storage capacity and a module output, said energy storage modules featuring one or more power connections at least for connection to a non-local power supply grid for carrying out non-localized control and system tasks in the non-local power supply grid and/or for connection to one or more local power supply grids for carrying out localized control and system tasks in the local supply network(s) by absorbing energy from and releasing energy to the connected power supply grid(s) and said energy storage modules being connected to each other via one or more data lines, wherein one of the energy storage modules is provided as master module and the other energy storage modules are provided as slave modules and the master module is configured for the overall control of all energy storage modules connected to the data line and at least the master module comprises at least one interface for receiving external control commands regarding the localized and non-localized control and system tasks to be carried out and a master control unit for storing and carrying out the external control commands, wherein, in order to carry out the external control commands, the master control unit is provided to have the module storage capacities and module outputs of all of the energy storage modules connected to it and to carry out the non-localized control and system tasks only within the scope of those portions of the system storage capacities and/or the system output that are not required for the localized control and system tasks.

By using the energy storage system as a decentralized intermediate storage system featuring the respective connections to local and/or non-local power supply grids, the local grid quality can be improved by localized control and system tasks on site and, at the same time, positive energy (fed into the grid) or negative energy (energy absorbed from the grid) is provided to the non-localized power supply grid for power supply grid regulation in order to carry out non-localized control and system tasks. By simultaneously carrying out localized and non-localized tasks and by simultaneously controlling all connected power supply grids in an appropriate manner, the requirements in the connected local and non-local power supply grids can be met simultaneously and efficiently. Furthermore, the system storage capacity and the system output can be effectively utilized based on the combination of localized and non-localized requirements (effective energy storage system), thereby helping to save resources. Due to the modular structure comprising a master module that controls the energy storage system and the option to couple slave modules to the master module in any number according to requirements, the total capacity (system capacity) and the total output (system output) of the energy storage system can be adjusted to the demands in the local and/or non-local power supply grids and, thereby, a fair compromise between operating expenses and operating benefits in terms of grid quality and available reserve energy can be reached. Due to the modular structure, it will also be possible at a later point during operation to expand or downsize the energy storage system as required, for example in order to be able to respond to varying energy demands in the connected power supply grids. As a result, the energy storage system can always be operated effectively, i.e., without unused excess capacity. To expand the modular energy storage system according to the invention, it is only necessary to connect a newly added energy storage module to the data line running to the master module and to the power connections of the energy storage system, for example to the common connection point for the energy storage modules. In one embodiment, every energy storage module has a unique identification by means of which it can identify itself and its functions, for example, the transferred operational data, in the energy storage system and the system interconnection. In one embodiment, the power connections of the master module and the slave modules have a common connection point for being connected to the power supply grid(s). The energy storage system according to the invention therefore facilitates expanding the total storage capacity and the total output quickly and easily according to requirements (scalability). To realize the modular structure, every energy storage module comprises a power connection so that every energy storage module is adapted to feature a separate electrical connection to one or more power supply grids and can therefore be operated in a largely autonomous manner in terms of the technical system equipment. The term "power connection" is understood to mean any electrical interface that is adapted to be connected to a power supply grid in an allowed manner. The connection to the non-local power supply grid and to each of one or more local power supply grids can be configured by a person skilled in the art in a suitable manner, wherein the connection is designed such that the power supply grids (the non-local one and the local one(s)) can be supplied with energy from the energy storage system independent of each other as required or energy can be taken from the power supply grids. The data lines between the energy storage modules can have any form that is appropriate. In one embodiment, the data line is configured as a data bus system such as, for example, as CAN bus, Profibus or Ethernet. Communication between the master module and the connected slave modules can, for example, be actively achieved via a reporting protocol wherein, in order to send the reporting protocol, the respectively receiving energy storage modules, the slave modules and/or the master module can respond to the reporting protocol by giving the appropriate answers or reactions. Communication can also be initiated by the master control unit due to direct request signals.

Herein, the energy storage system can either be directly connected to a non-local power supply grid or to each of one or more local power supply grids, or the energy storage system can indirectly be connected to a non-local power supply grid via a connected local power supply grid, provided that the local power supply grid is a part of the non-local power supply grid, i.e., is connected to the non-local power supply grid. Localized control and system tasks are, for example, securing the local line voltage required, the reactive power compensation by regulating the amplitude and phase position of the voltage signal, the provision of a local power reserve for major electricity consumers that might additionally be connected or for start-up peaks, and the storage of local excess amounts of energy. Non-localized control and system tasks are, for example, the provision of primary or secondary reserve power. The reserve power ensures that power customers are supplied with precisely the electrical power that is required in the event of unforeseen incidents in the power supply grid. To achieve this, the output of power stations that are capable of producing reserve power can be adjusted for a short time, or rapidly starting energy storage systems, such as the energy storage system according to the invention, can be used. The primary reserve power serves to correct imbalances between the physical power offered and the power demanded, with the objective to restore a stable line frequency. The secondary reserve power is intended to restore the balance between the physical electricity offered and the electricity demanded after a difference has occurred wherein, in contrast to the primary reserve power, nothing but the situation in the particular control zone including the exchange of electricity with other control zones is under consideration. Further non-localized control and system tasks are, in addition, the provision of energy storage systems to support a black start, the general storage of power peaks, and the reactive power compensation in the non-localized power supply grid. Further localized or non-localized control and system tasks for local and/or non-local power supply grids are the provision of redundancy (fail-safe operation) of power supply in combination with the already existing energy suppliers, and reactive power management.

An energy storage module that is adapted to be used as a master module must at least comprise a master control unit and an interface for receiving the external control commands. If only one energy storage module out of more than one energy storage modules of an energy storage system meets these requirements, this energy storage module is provided as master module due to its equipment. If, however, multiple of energy storage modules meets the component-related requirements, any one of these energy storage modules can be defined as master module. This definition can, for example, be specified on installation of the energy storage systems, based on the hardware or the software. In a further exemplary embodiment, it is also possible that the suitable energy storage modules determine a master module themselves in an organized manner. In this way, it is ensured that, in any combination of energy storage modules desired, it is always one energy storage module that assumes the role of the master module and that the energy storage system is automatically ready for operation after all connections have been established. For example, the control units of the suitable energy storage modules are designed to send a master signal after completed commissioning whereupon the energy storage module that was the first energy storage module to send the master signal automatically becomes the master module in the energy storage system. The other energy storage modules will, thereafter, automatically become slave modules. Within the scope of the present invention, the person skilled in the art can also file other selection criteria for determining the master module in the energy storage modules.

Herein, the non-local power supply grid denotes a power supply grid which extends over very large areas in a supraregional manner and in which the non-localized control and system tasks are carried out. Non-local power supply grids are, for example, transmission networks (public power supply grid). In Germany, the public power supply grid is, for example, composed of four transmission networks which are operated by the network operators Amprion, 50 Hertz, Tennet, and TransnetEnBW. Together, the four transmission networks form the Netzregelverbund for Germany (cooperation in terms of control power). In other countries, appropriate transmission networks are operated by other network operators. In the transmission networks, the frequency of the power supply grid is maintained at a stable value (frequency control). The superordinate wide area synchronous grid in Europe that is composed of the respective transmission networks in the individual states must also be considered to be a non-local power supply grid for which, however, only the standards for the reserve power are defined at the moment. The non-localized control and system tasks are carried out in the respective transmission networks. Local power supply grids within the meaning of the invention are power supply systems in which the localized control and system tasks described above are carried out. Normally, local power supply grids are delimited in space, for example, an inhouse power supply system on a facility site or a power supply system inside a building or a complex of buildings.

The term "receive" is understood to mean any type of activity in which external data are transmitted to the energy storage system. These external data are, for example, control commands on the basis of which the energy storage system is controlled by the master module. The external data are transmitted by external systems, for example, control systems of the local power supply grid for localized control and system tasks and/or control systems of the non-local power supply grid, a superordinate interconnection control or local measuring points for localized and/or non-localized control and system tasks. These control commands comprise the localized and non-localized control and system tasks that are carried out by the energy storage system according to the invention within the scope of its possibilities and other general conditions. This transmission can, for example, be achieved via a communication network. The energy storage system comprises one or more interfaces for receiving the external data. The interface(s) can be any interface adapted for this purpose. Depending on the connected communication network, the interfaces can be formed to establish a connection, for example, to a radio-based network, a mobile network, a high availability connection, a network according to IECG, a wired telephone network, a data connection by means of the power cables in the power supply network, or a computer network (for example, the internet). This is to advantage in that multiple alternative interfaces are at least available in the master module. In the event of an interrupted connection via one of the aforementioned networks, the master module can be designed to re-establish the connection via a different interface of the master module through an alternative network. Due to the redundancy of the interfaces, possibly important control commands can nevertheless be received via alternative communication networks. Therein, potential sub-communication networks are radio-based, cable-based or current-based communication networks, for example, via the mobile network, the internet, the normal telephone network or via a data connection by means of power cables in the power supply network. However, the external data (control commands) can also be received by a data carrier via an interface by being read from a corresponding data carrier drive (for example, a CD-ROM) or via a data carrier interface (for example, a USB data stick). Alternatively, the external control commands can also be received by direct input via a corresponding user interface (screen and keyboard).

In one embodiment, the energy storage system is, here, connected to a non-local power supply grid and to one or more local power supply networks. Here, the localized and non-localized control and system tasks in the respective connected power supply grids are carried out separately in a logical manner. In a further embodiment, the energy storage system is only connected to one or more local power supply grids at least one of which is connected to the non-local power supply network. In this case, the localized control and system tasks are carried out in the respective local power supply grids, while the non-localized control and system tasks are carried out in the non-local power supply grid via the connected local power supply grid that is connected to the non-local power supply grid. In certain operating states, for example, in the event of a failure of one or more power supply grids, an energy storage system can also be completely disconnected from the non-local power supply network for safety reasons. This disconnection may, for example, be limited in time. The same can also apply to the local power supply grid(s).

Therein, the energy storage modules according to the invention may be any suitable type of energy storage modules which, due to their storage properties and storage parameters, are not only able to assume localized control and system tasks but, in addition, also non-localized control and system tasks in non-local networks by providing primary or secondary reserve power. Suitable energy storage modules are, for example, local (decentralized) compressed air reservoirs or hydrogen storage systems in combination with fuel cells, battery systems or kinematic energy storage systems, such as flywheel energy storage units. Therein, the energy storage system can comprise only a single energy storage module or more than one energy storage modules. An energy storage module is understood to mean the functional unit that can release energy to the connected power supply grids or to an internal power supply grid of the energy storage system or can absorb energy from such a system. In the latter case, the internal power supply grid of the energy storage system is connected to the local and/or non-local power supply grids. In one embodiment, the energy storage module comprises one or more flywheel energy storage units for reversible storage of energy within the energy storage module. This storage is referred to as reversible because the energy that is stored as rotational energy can be absorbed from the flywheel energy storage units according to requirements and be totally fed by the energy storage module or the energy storage system as electric energy into a power supply grid and, in the opposite case, electric energy can be absorbed from the power supply grid and be mechanically stored in the flywheel energy storage units in the form of rotational energy. Flywheel energy storage units are to advantage in that they make the amounts of energy to be absorbed or released available to the consumers in a highly variable and precise manner and store this energy in the form of mechanical energy. As a consequence, flywheel energy storage units cause a potential hazard in the event of fire that is considerably smaller than, for example, that of a large accumulation of batteries interconnected as a battery energy storage system or hydrogen storage systems with hydrogen tanks containing combustible hydrogen as a potential hazard. Although, in contrast, non-combustible gases can be used for storing energy in compressed air reservoirs, compressed air tanks nevertheless pose a potential explosion hazard because of the high pressure in the compressed air tanks. If used as energy storage systems, flywheel energy storage units therefore represent an energy provision technology that is environmentally safer than other storage technologies and are well suited for any number of load cycles per day desired. Energy provision is referred to as negative energy provision when energy is absorbed from the power supply grid and is stored in the flywheel energy storage unit in the form of mechanical rotational energy. Accordingly, energy provision is referred to as positive energy provision when energy that is stored in the flywheel energy storage unit in the form of mechanical rotational energy is fed into the power supply grid by decelerating the flywheels (or rotors). Herein, the capability of flywheel energy storage units to provide energy within a few milliseconds is just as advantageous as the capability to provide the specified power over a period of a plurality of minutes.

The master control unit refers to a component in the energy storage module arranged as master module in the energy storage system, said component controlling the energy storage system, i.e., setting the desired operating states and operating parameters, and controlling the energy storage system according to an operating plan that contains the desired operating states as a function of time. The operating plan is at least based on the external control commands regarding the localized control and system tasks, to which the control commands regarding the non-localized control and system tasks are or can be added. Furthermore, the master control unit is able to appropriately respond to changing conditions in the local power supply grid and to increase or keep constant the quality of the local power supply grid by feeding or absorbing energy or to re-improve the quality of the local power supply grid in the event of a failure in the latter. The control commands (instructions) that are received correspond to the localized and/or non-localized control and system tasks for the energy storage system. In addition to the control and system tasks in the local power supply grid, the master control unit can receive commands, instructions, etc. from an external (non-local) control unit for the non-local power supply grid and carry out these commands or instructions parallel with the localized control and system tasks. Herein, the term "carry out" refers to the master control unit controlling the energy storage system according to the present control commands for the localized and non-localized control and system tasks for the connected power supply grids. Therein, the external (non-local) control unit regulates the demand for the reserve power for the non-local power supply grid and can request this demand from the energy storage system via the communication network within the scope of the free capacities of the energy storage systems (i.e., the capacities of the energy storage systems that are not required for localized control and system tasks) in the form of non-localized control and system tasks. Further external systems from which the energy storage system may receive non-localized control and system tasks would, for example, be a power support interconnection or an energy exchange which would render the infeed or absorption of energy during specific operating times appropriately low-priced. Further external variables for non-localized control and system tasks are, for example, the demand for reactive power, a peak load compensation, or local storage demand required in the non-local power supply grid.

In a further embodiment, the master control unit comprises a priority management unit for carrying out the individual external control commands, wherein carrying out the external control commands regarding localized control and system tasks in the local power supply grid(s) has priority over carrying out the external control commands regarding non-localized control and system tasks in the non-local power supply grid. The priority management unit can be implemented as a data memory which the master control accesses before it carries out the external control commands and carries out the next external control commands according to the priorities set. Therein, the priorities can be stored in the data memory in a manner that is unchangeable with respect to external access. For example, priorities can be changed by replacing the respective data memory or the respective file containing the priority management unit on site in the energy storage module. In case of a single energy storage system, the free capacity is either sufficient to fulfill the non-localized control and system tasks under normal conditions, or the additional capacity that is reserved for localized control and system tasks would not be sufficient as a potential reserve for solving the grid problem in exceptional cases. In this respect, the priority of the localized control and system tasks is based on the finite system storage capacities and system outputs. If, however, multiple energy storage systems are connected to the non-local power supply grid, the demand for reserve power in the non-local power supply grid could also be met by other energy storage systems because, thus, a sufficient free system storage capacity and system output can be used without the localized control and system tasks having to be neglected or even ignored in exchange. An energy storage system featuring ten energy storage modules corresponds to 1.4 MWh. If combined in a system interconnection, twenty energy storage systems therefore correspond to 28 MWh as a joint energy storage system. For example, 1 MHh is locally reserved for each energy storage system. This results in an available capacity of the energy storage system for non-localized tasks of 8 MWh. Therein, simultaneous requirements for the provision of further power would have to be additionally considered and, if necessary, be taken into account.

In case of a disturbed reception of the external control commands, the master control unit in a further embodiment is provided to have the module storage capacities and module outputs of all of the energy storage modules connected to it only available for carrying out the control commands regarding the localized control and systems tasks to be carried out in the connected local power supply grid(s) until the reception of external control commands has been restored. To detect a failure, the master module can periodically send out test signals and process the absence of a corresponding feedback signal as the verification of a disturbed reception. For example, such a test signal is a so-called digital handshake which is used to verify whether or not the communication connection exists. To achieve this, the master control unit sends a data packet to an external connected system and receives back in response a corresponding data packet (feedback) via the communication network. The master control unit records both the transmission and the received feedback and stores this to a suitable data memory, for example, to a server. In case interrupted reception is continued, the general conditions for the non-localized control and system tasks and, therefore, these tasks themselves as well may change. If the reception of external control signals is disturbed, the master control unit therefore limits itself to carrying out localized control and system tasks. The preference of localized control and system tasks is to advantage in that, after communication to the outside has failed, the master control unit no longer receives any feedback on the current state of the non-local power supply grid. If the master control unit simply processes the present tasks without further external control signal to be received, this could under special circumstances even result in a failure of the power supply grid because of overload. Therein, it is to advantage to only carry out the localized control and system tasks which the energy storage system is obliged to carry out and can, if necessary, keep the appropriateness of these localized tasks under surveillance itself via its own measuring units. If necessary, the localized tasks can be initiated on site by changing the task memory. This is not possible for the non-local power supply grid because the demands of the non-local power supply grid also depend on interventions on the part of other power stations, consumer systems or storage systems an overview of which is not available to the energy storage system according to the invention itself in the event of disturbed communication.

In a further embodiment, the master module comprises a first test unit which is provided to check the received external control commands for plausibility and/or origin and to transmit to the master control unit a positive or negative first test result before the master control unit stores the received external control commands. This prevents unauthorized persons from gaining access to the system or module core, i.e., the master control unit. This contributes to the operational safety of the energy storage system towards the outside world and to the security of energy supplies. In case of the received non-localized and localized control and system tasks, the origin can, for example, be included in the received data packet and accordingly be read by the first test unit and compared with the expected data structure of the origin identifier. Herein, the origin can, for example, be transmitted as hash value which the first test unit can compare with the hash values for allowed data sources for non-localized and localized control and system tasks, which it has available. The origin is verified to be allowed, if the available hash value is identical with the received hash value. The non-localized and localized control and system tasks may also be transmitted in a coded manner, wherein the decoding key is characteristic of the particular origin. If the non-localized and the localized control and system tasks can be decoded using a decoding key, this decoding key is characteristic of the origin of the data received. For example, the plausibility of the received data can also be checked negatively, i.e., the localized and non-localized control and system tasks do not represent any tasks which cannot be carried out due to the system storage capacity and the system output or the tasks contain meaningless data in terms of data format. Therein, a plausibility check can comprise the calculation of a checksum, a data sum check and/or an encryption with subsequent successful decryption.

In a preferred embodiment, the master control unit is provided to switch all of the energy storage modules of the energy storage system into a safe operating state if the first test result for the received external control commands is negative. If an attempt of unauthorized access to the energy storage system is made, the energy storage system therefore responds in a self-protecting manner in the form of control and system tasks which have an unknown origin or a suspicious content. For example, a safe operating state is reached when the carrying out of all control and system tasks is stopped and the energy storage system is set to a passive mode (no release of energy to or absorption of energy from outside or a completed internal load shedding action). This mode can be maintained until the next external control signals are received that produce a positive test result on origin and content. A further safe operating state is reached when the energy storage system is electrically isolated. In a preferred embodiment, the master control unit disconnects the power connections of all energy storage modules from the connected power supply grids. In a further embodiment, the master control unit sends an alarm signal to the energy storage system and/or to the outside via one of the interfaces. In response to the alarm signal and the completed isolation from the grid, the master control unit can, for example, try to establish a connection via a communication network in order to receive new non-localized and/or localized control and system tasks the origin and content of which are correct. If the correct external control data are again available, the master control unit can again switch the energy storage system from the safe operating state to normal operating mode and, if necessary, power connections are re-established.

In a further embodiment, the slave modules each comprise slave control units which are designed to monitor and control the operating states of the respective slave module and to transmit to the master module operating data of the slave module via the data line, said operating data, for example, comprising the module storage capacity and module output not required for the localized control and system tasks. Since the slave modules are equipped with their own slave control units, the master control unit does not need to directly intervene in the machine functions of the slave modules to carry out external control commands (carry out the control and system tasks). Here, the master control unit can, for example, transmit module-dependent control and system tasks which the slave control units then carry out to implement the corresponding machine parameters. As a result, the complexity in terms of control on the part of the master control unit can be reduced and therefore simplified. Since the slave modules are equipped with slave control units, the efforts required to additionally integrate further slave modules into an energy storage system are low because the machine parameters of the added slave modules do not have to be programmed in the master control unit but are separately controlled by the master control unit and autonomously by the slave control units. The slave control unit directly measures the operating states in the individual slave modules, with the result that the efforts required for the control lines are limited to the particular energy storage module and the system complexity is therefore reduced. The slave control units can evaluate the operating states and create therefrom suitable operating data to be transmitted to the master control unit. This transmission can, for example, be made periodically (typically clock rates of less than 100 ms) or whenever an operating state changes or an operating parameter exceeds or falls below limit values.

In a further embodiment, the master module comprises a second test unit which is provided to check the operating data transmitted by the slave modules for plausibility and/or origin and to transmit to the master control unit a positive or negative second test result before the master control unit stores the transmitted operating data. This measure installs an additional system-internal protection which prevents unauthorized persons who have gained access to the individual modules or to the data connection from additionally gaining indirect access to the master control unit as well and thus to the overall system. Any unauthorized access might convey incorrect operating states to the master control unit, whereupon the master control unit sends incorrect energy system parameters to the outside and, accordingly, receives incorrectly dimensioned external control commands, this putting the grid security at risk should the situation arise. Furthermore, the master control unit might transmit wrong instructions for carrying out the external control commands to the slave modules, this being apt to damage the energy storage modules should the situation arise. By testing the operating data, the second test unit therefore contributes to the operational safety of the energy storage system both internally and externally and to the security of energy supplies. In the received operating data that have been transmitted, the origin can, for example, be included in the received data packet and accordingly be read by the second test unit and compared with the expected data structure of the origin identifier. Herein, the origin can, for example, be transmitted as hash value which the second test unit can compare with the hash values for the individual slave modules, which it has available. The origin is verified to be allowed, if the available hash value is identical with the received hash value. The operating data may also be transmitted in a coded manner, wherein the decoding key is characteristic of the particular origin. If the operating data can be decoded using a decoding key, this decoding key is characteristic of the origin of the transmitted operating data. The plausibility of the transmitted operating data can, for example, be checked in that the operating data exhibit an abrupt change which is not to be expected from the history and the operating state applicable up to that point. A plausibility check can also be used to verify whether the operating data represent meaningful values within the scope of the system storage capacity and the system output and whether the data format transmitted is a valid one.

In a further embodiment, the master control unit is provided to switch a specific slave module into a safe operating state if the second test result for the transmitted operating data of that slave module is negative. What has been described above for the first test result with regard to the safe operating state, is also applicable here. In a preferred embodiment, the master control unit disconnects the power connections of this slave module from the connected power supply grids. To achieve this, the master control unit is connected to each power connection of each slave module via appropriate data connections, and the power connections of the slave modules are designed such that they can be switched electronically. In a further embodiment, the master control unit sends an alarm signal to the energy storage system and/or to the outside via one of the interfaces. In response to the alarm signal and the completed disconnection of the respective slave module from the grid, the master control can, for example, try to once again have operating data of this slave module transmitted to it, the origin and content of which are correct. If the correct operating data are again available, the master control unit can again switch the respective slave module from the safe operating state to normal operating mode and, if necessary, the power connection of the slave module is re-established.

In a further embodiment, the slave module also comprises an interface for receiving external control commands regarding the localized and non-localized control and system tasks to be carried out, and, in the event of a failure of the present master module or the present master control unit, the slave control unit is formed to store the external control commands and to control the other slave modules as new master control unit. Since the slave module is also able to receive external control commands, it is also adapted to control the energy storage system in an overall manner. Thereby, a redundancy in the management (control) of the energy storage system is provided, with the result that the operational safety and availability of the energy storage system are ensured even in the event of a failure of the master control unit. The data line(s) connect(s) not only the master control unit to all slave control units but also all slave control units to each other (mesh network). As a result, a slave control unit can assume the task of controlling the energy storage system at any time and as a substitute. In a preferred embodiment, the master control unit is provided to establish a hierarchy according to which the slave control units assume the task of controlling the other slave modules in the event of a failure of the present master module or the present master control unit and to transmit said hierarchy to the slave modules. Based on the hierarchy, the slave module determined can immediately continue to control the energy storage system as the new master module. As a result, continued availability and security of the system are ensured in the event of partial failures in the energy storage system.

In a further embodiment, the master control unit checks the data line running to the slave modules for their functional efficiency by means of a so-called handshake signal that is periodically sent to the slave modules, and the slave modules are provided to transmit to the master control unit on the basis of the received handshake signal a return signal that is characteristic of the respective slave module, and the master control unit is provided to determine the functional efficiency of the data line running to the respective slave modules based on the received return signal. The absence of a corresponding return signal within a preset time window serves to verify a disturbed connection to the slave modules. To achieve this, for example, the master control unit sends a slave-module-specific data packet to the respective slave modules which send corresponding slave-module-specific return signals. The master module, however, might also send a general handshake signal to all slave modules in response to which the slave modules after they have received it send the corresponding slave-module-specific return signals to the master control unit. Based on the slave-module specific return signals, the master control unit finds out whether there is an undisturbed data connection to all slave modules and, in case only a part of the return signals has been received, determines the slave modules to which the data connection is disturbed. The master control unit records the completed transmission of the handshake signal and the received return signals and stores this fact to a suitable data memory, for example, to a server. The determination of an existing data line is essential for the master control unit to ensure that the control commands transmitted to the slave modules for carrying out the control and system tasks can in fact be received and implemented by the slave modules. Otherwise, it would not be ensured that the external control commands for securing the grid quality and providing the reserve power are carried out. In a preferred embodiment, the master module is provided to disconnect at least the power connections of the master module from the respective power supply grids in case the data line running to all slave modules lacks functional efficiency. In a further embodiment, the master control unit additionally disconnects all power connections of all slave modules from the connected power supply grids. To achieve this, the master control unit is connected to each power connection of each slave module via appropriate data connections, and the power connections of the slave modules are designed such that they can be switched electronically. In a further embodiment, the slave module is provided to disconnect the power connections of the slave module from the respective power supply grids in case the handshake signal fails to be received. When the handshake signal is periodically sent to the slave modules, the slave control units know after which time period a new handshake signal is to be expected. This period can be selected by the person skilled in the art in a suitable manner, for example, the handshake signal is sent at intervals within a range of a second. If a plurality of periods elapse without handshake signal, the slave module enters a safe operating state and the slave control unit disconnects the slave module from the connected power supply grids to prevent hazard to the power supply grid, for example, caused by overload because the slave module no longer has any current information about the demand in the connected power supply grids if communication with the master control unit is disturbed and the previous operating state would now perhaps be no longer necessary or even critical for the connected power supply grids.

In a further embodiment, the energy storage system is, via a regulating unit, connected to the one or more local power supply grids and to the non-local power supply grid, wherein the regulating unit is configured to regulate an energy flow between the connected power supply grids and the energy storage system. If the local and non-local power supply grids were only connected to the connection point of the energy storage system, the energy fed in by the energy storage system would only be fed into the power supply grid that has the bigger demand for energy. In this manner, however, specific local and non-local regulation according to an assignment of tasks would no longer be possible. Current energy storage systems are typically connected to a single power supply grid via a switch. In this case, the above control of the energy flow would no longer be applicable and the switch would have to be opened only in the event of power failure. In the present invention, however, the regulating unit is equipped such that, after one power supply grid has been disconnected, the other connected power supply grids will still be supplied with energy as desired or that energy can be absorbed from these power supply grids because the energy storage system has to supply more than one separate power supply grids at the same time within the scope of the present invention. The regulating unit controls the energy flow to the connected networks in the manner provided by the controller. In a preferred embodiment, the regulating unit is furthermore provided to disconnect one or more of the connected power supply grids from the energy storage system in case of need. In the event of a failure of one of the connected power supply grids, the regulating unit disconnects this power supply grid from the energy storage system at once, i.e., within a few milliseconds, to ensure that the energy storage system continues to be operable for the other power supply grids. Otherwise, a short circuit or an overload situation would occur as the case may be. In a further embodiment, the regulating unit comprises for this purpose a regulating box having at least one control element and one or more circuit breakers which are controlled by the control element and the number of which depends on the number of power supply grids connected to the regulating unit. Therein, the regulating box is connected to the control unit via a data line, either directly or through the regulating unit, wherein the control unit can use said data line to transmit the configuration data of the regulating function to the control element.

Furthermore, the invention relates to a master module that is adapted to be used in an energy storage system according to the present invention having a system storage capacity and/or system output, wherein the master module has a module storage capacity and a module output and is formed with one or more power connections at least for connection to a non-local power supply grid for carrying out non-localized control and system tasks in the non-local power supply grid and/or for connection to one or more local power supply grids for carrying out localized control and system tasks in the local supply network(s) by absorbing energy from and releasing energy to the connected power supply grid(s), said master module comprising an interface for receiving external control commands regarding the localized and non-localized control and system tasks to be carried out and being provided to be connected to other energy storage modules via one or more data lines, preferably a data bus system, and said master module comprising a master control unit for storing and carrying out the external control commands, wherein, in order to carry out the external control commands, the master control unit is provided to have the module storage capacities and module outputs of all of the energy storage modules connected to it and to carry out the non-localized control and system tasks only within the scope of those portions of the system storage capacities and/or the system output that are not required for the localized control and system tasks.

In an energy storage system having only one master module, the system storage capacities and the system output correspond to the module storage capacity and the module output of the master module. A master module represents a self-sustaining system that, in one embodiment, can be put into operation as energy storage system as such. Where multiple energy storage modules are concerned, the individual capacities and outputs add up to form the system storage capacities and the system output.

In one embodiment, at least the master module comprises one or more measuring units for measuring single or multiple relevant data in the respective connected power supply grids, and the master control unit is provided to control the master module and the slave modules, if any are provided, for the localized control and system tasks by using the external control signals in these local and non-local power supply grids based on the measured relevant data. Therein, the measuring units can be integrated into the local and/or non-local power supply grid or be arranged at one or more points of the local power supply grid. The measuring units can also be arranged at the connecting point between the energy storage system and the local and/or non-local power supply grids. Measuring units within the scope of the present invention are, for example, measuring probes for measuring the line frequency and the line voltage as an example of relevant data for the connected local power supply grid. Further measuring variables are, for example, the voltage trend as a function of time, the phase angle, the neutral point, the line frequency, the line current, and other variables. Within the scope of the present invention, the person skilled in the art can select suitable measuring units or measuring probes and arrange them at the appropriate position. If, for example, the desired line frequency is 50 Hz and the measuring units detect that the line frequency is decreasing, the master control unit will automatically feed energy into the local power supply grid (localized control and system task) on the basis of the currently measured line frequency (as measured relevant data) and a response hierarchy filed in the control unit, until the line frequency has again reached the desired value. Further examples are the measurement of the phase angle in the local power supply grid in order to provide the appropriate reactive power compensation, or, if the load consumed in the local network is too high or too low, the measurement of the voltage to maintain the voltage quality. For other control and system tasks, other appropriate response hierarchies are filed in the master control unit.

In a further embodiment, the master module comprises a task memory for storing the received external control commands regarding the non-localized and localized control and system tasks, which the master control unit accesses for controlling the energy storage system according to the non-localized and localized control and system tasks. The task memory may be a suitable data memory in the master module. Therein, it can be designed as a part of the master control unit or a separate memory. In either case, the master control unit is connected to the task memory via a data connection such that it can access the task memory at any time, read the non-localized and localized control and system tasks stored therein and control the energy storage system according to these tasks. Within the scope of the present invention, the person skilled in the art can configure the circuit-related access of the master control unit to the task memory and the energy storage modules of the energy storage system to be activated in an appropriate manner. The instructions (external control commands) regarding the non-localized and localized control and system tasks can, for example, be stored in the task memory as the following instruction: "Storage from the non-local power supply grid xx kWh on day y beginning at zz hours". In a further example, the instruction in the task memory might be: "Feeding xx kW per hour into the local power supply grid beginning at zz hours today". The person skilled in the art can select the concrete data format of the instructions within the present invention in an appropriate manner. These instructions (or tasks) in the task memory can, for example, refer to a reserve power or the stabilization of a voltage or electric current. Therein, the instructions (or tasks) can be stored with or without time reference. An instruction (or task) without time reference may, for example, be as follows: "Supply the appropriate reserve power subject to the grid frequency deviation of 50 Hz according to a specified curve".

In a further embodiment, the master control unit is configured to register and evaluate operating data of the energy storage system and to transmit via the interface a reporting protocol to corresponding external systems from which it receives the external control commands, said reporting protocol comprising the operating data. In this manner, at least the operating data for the external control commands to be received can be taken into account. For example, the operating data of the energy storage system show the available system capacity and system output and the (currently) free non-local capacity (the capacity that is not required for the localized control and system tasks) and the (currently) free non-local output (the system output that is not required for the localized control and system tasks) available in the energy storage system for non-localized tasks and/or the localized control and system tasks planned for the future. Therein, the operating data can be measured by the master control unit itself, or operating sensors or the slave modules transfer the operating data to the master control unit via corresponding data lines. The operating data registered in this manner are evaluated by the master control unit according to a scheme filed in the master control unit, for example, by means of an appropriate software program, and are then transmitted as operating data in predefined format via the interfaces already described above. The clock pulse for the transmissions is, for example, 1 Hz. For example, the master control unit registers the actual values of the energy module storage states and the storage states of the individual flywheel energy storage unit, respectively, the states of the connected power supply grids (for example, voltage and current), and allocates these data for carrying out the localized and non-localized control and system tasks. The reporting protocol can, for example, comprise not only the operating data but also the identity of the energy storage system in the form of a characteristic designation such as an identification number and, possibly, the location at which the energy storage system is set up in the form of geographic coordinates. Therein, the reporting protocol has a data format that is adapted to be received and processed by the desired external bodies. The transmitted operating data, including the information about the actual and planned data of free system storage capacities and free system outputs, can then be received and appropriately planned by an external control unit and, subsequently, corresponding system-specific non-localized or localized control and system tasks can be transmitted back to the energy storage system in the form of external control commands.

Furthermore, the invention relates to a method for operating an energy storage system according to the present invention having a system storage capacity and/or system output and having more than one of energy storage modules that are connected via one or more data lines, preferably a data bus system, said energy storage modules each having a module storage capacity and a module output and each featuring one or more power connections for connection to one or more power supply grids, comprising the following steps:

connecting the respective energy storage modules comprising a master module and one or more slave modules to a non-local power supply grid for carrying out non-localized control and system tasks in the non-local power supply grid and/or to one or more local power supply grids for carrying out localized control and system tasks in the local power supply grid(s) by absorbing energy from and releasing energy to the connected power supply grid(s);

receiving external control commands regarding the localized and non-localized control and system tasks to be carried out by means of an appropriately configured interface of the master module;

storing and carrying out the external control commands by means of a master control unit of the master module, wherein, in order to carry out the external control commands, the master control unit has the module storage capacities and module outputs of all of the energy storage modules connected to it;

carrying out the non-localized control and system tasks only within the scope of those portions of the system storage capacities and/or the system output that are not required for the localized control and system tasks.

In one embodiment, the energy storage system is, here, connected to a non-local power supply grid and to one or more local power supply networks. Here, the localized and non-localized control and system tasks in the respective connected power supply grids are carried out separately. In a further embodiment, the energy storage system is only connected to one or more local power supply grids at least one of which is connected to the non-local power supply network. In this case, the localized control and system tasks are carried out in the respective local power supply grids, while the non-localized control and system tasks are carried out in the non-local power supply grid via the connected local power supply grid that is connected to the non-local power supply grid. In certain operating states, for example, in the event of a failure of one or more power supply grids, an energy storage system can also be completely disconnected from the non-local power supply network. This disconnection may, for example, be limited in time. The same can also apply to the local power supply grid(s).

In one embodiment, the method comprises the following further step:

carrying out the individual external control commands by means of a priority management unit by the master control unit, wherein carrying out the external control commands regarding localized control and system tasks in the local power supply grid(s) has priority over carrying out the external control commands regarding non-localized control and system tasks in the non-local power supply grid.

In one embodiment, the method comprises the following further step:

exclusively carrying out the control commands regarding the localized control and system tasks to be carried out in the connected local power supply grid(s) in case of disturbed reception of the external control commands wherein, to achieve this, the master control unit has the complete module storage capacities and module outputs of all of the energy storage modules connected to it, until the reception of the external control commands has been restored.

In the event of disturbed reception, the master control unit is, preferably, configured to re-establish the connection via one of the alternative sub-communication networks available in the communication network. To achieve this, at least the master module comprises more than one interfaces to sub-communication networks in the communication network. During normal operation with the communication connection being established, all connected power supply grids are therefore taken into account in the control activities. Here, the term "normal operation" refers to operation of the energy storage system with the non-local power supply grid being available and being undisturbed to a large extent.

In a further embodiment, the method comprises the following further steps:

monitoring and controlling operating states of the slave modules by a slave control unit in the respective slave module; and periodically transmitting operating data of the slave module to the master control unit via the data line, comprising the module storage capacity and the module output not required for the localized control and system tasks.

In a further embodiment, the method comprises the following further steps:

checking the received external control commands for plausibility and/or origin by a first test unit of the master module and transmitting a positive or negative first test result to the master control unit before the master control unit stores the received external control commands; and/or checking the operating data transmitted by the slave modules for plausibility and/or origin by a second test unit of the master module and transmitting a positive or negative second test result to the master control unit before the master control unit stores the transmitted operating data.

In a further embodiment, the method comprises the following further steps:

switching all energy storage modules of the energy storage system to a safe operating state by the master control unit if the first test result is negative and sending out an alarm signal to the energy storage system and/or to the outside; and/or switching the slave module for the transmitted operating data of which a negative second test result was received from the second test unit to a safe operating state by the master control unit and sending out an alarm signal to the energy storage system and/or to the outside.

In a further embodiment, the method comprises the following further steps:

setting up and transmitting a hierarchy according to which the slave control units are intended to assume the task of controlling the other slave modules in the event of a failure of the present master module or the present master control unit;

assuming the task of controlling the energy storage modules by one of the slave modules acting as new master module in the event of a failure of the present master module or the present master control unit according to the hierarchy, wherein at least this slave module also comprises an interface for receiving external control commands regarding the localized and non-localized control and system tasks to be carried out.

In a further embodiment, the method comprises the following further steps:

periodically checking the data line for the functional efficiency thereof at least by the master control unit by means of a so-called handshake signal sent out to the slave modules;

transmitting a return signal by the respective slave modules due to the received handshake signal, said return signal being characteristic of the respective slave module; or disconnecting the power connections of the slave module from the respective power supply networks by the slave module if the handshake signal fails to be received;

ascertaining the functional efficiency of the data line running to the respective slave modules by the master unit due to the received return signal; or disconnecting all power connections from the respective power supply grids by the master module if there is no return signal.

In one embodiment, the method comprises the following further step:

defining one of the energy storage modules as a master module and the other energy storage modules as slave modules.

SHORT DESCRIPTION OF THE FIGURES

These and other aspects of the invention will be shown in detail in the figures below. In the figures, FIG. 1 shows an exemplary embodiment of an energy storage system according to the invention;

DETAILED DESCRIPTION OF THE EXEMPLARY EMBODIMENTS

Figure 1:
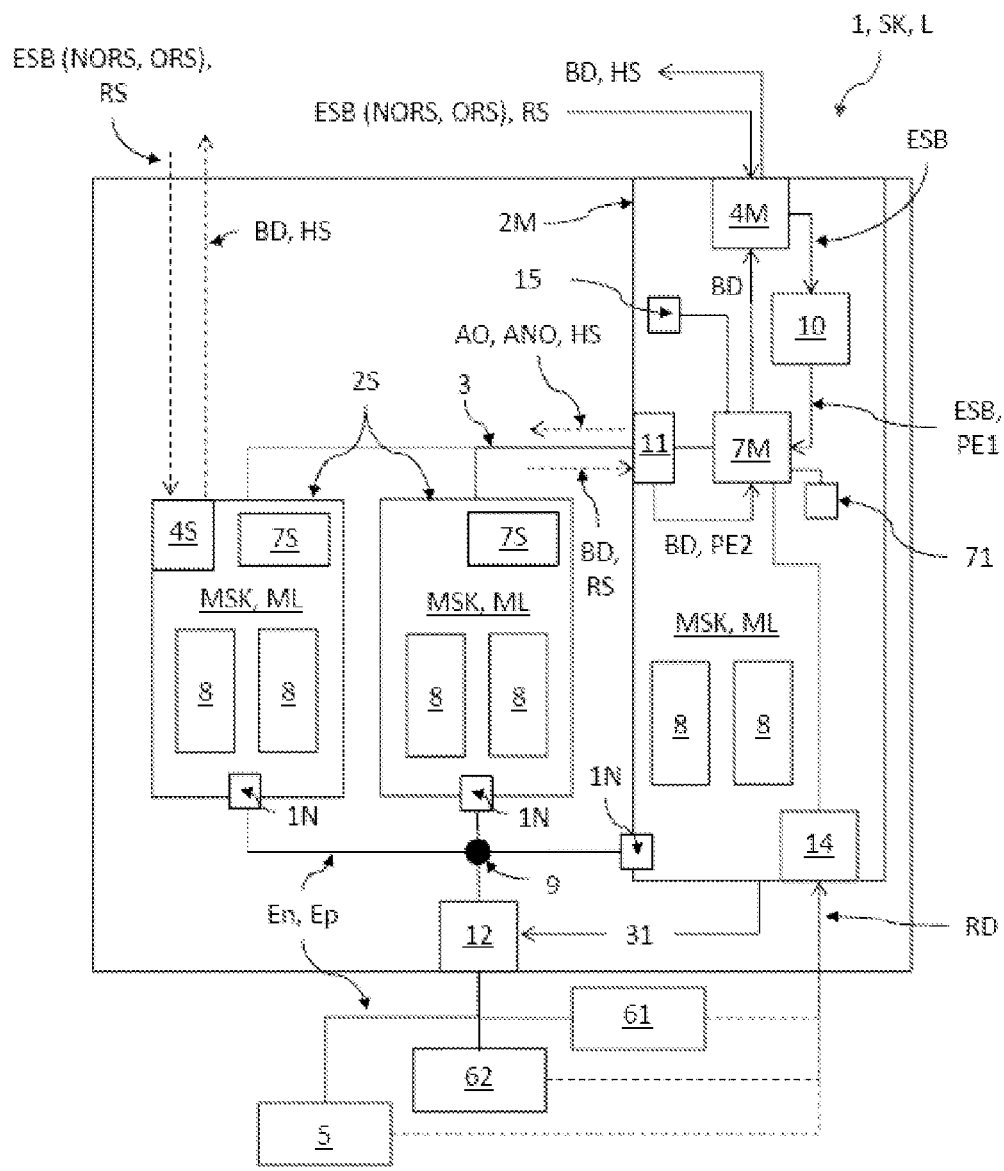

FIG. 1 shows an exemplary embodiment of the energy storage system 1 according to the invention. In this embodiment, the energy storage system 1 has three energy storage modules 2M, 2S each having two flywheel energy storage units 8 for reversible storage of energy per energy storage module 2M, 2S each having a module storage capacity MSK and a module output ML. The three energy storage modules 2M, 2S are split between a master module 2M for controlling the energy storage module 1 and two slave modules 2S. The embodiment shown here is only exemplary. The number of energy storage modules 2M, 2S per energy storage system 1 depends on the particular application desired and therefore vary strongly. Use can also be made of energy storage systems 1 having only one single energy storage module 2M which, in the present case, is a master module 2M. In the illustrated instance, the energy storage modules 2M, 2S are connected via a common connection point 9, with the result that their module capacities MSK and module outputs ML are available in total as the system storage capacity SK and system output L of the energy storage system 1 for control and system tasks NORS, ORS. In energy storage systems 1 having only one single energy storage module 2M, the connection point 9 can also be omitted. Likewise, the number of the flywheel energy storage units 8 in an energy storage module 2M, 2S may vary from energy storage module to energy storage module and from energy storage system to energy storage system. A high number of flywheel energy storage units 8 per energy storage module 2M, 2S is to advantage in that it increases the system storage capacity SK and the system output L of the energy storage system 1. The energy storage modules 2M, 2S are connected to each other via a data line 3. Therein, this data line can be extended to be able to add additional energy storage modules 2S to the existing three energy storage modules 2M, 2S at a later point if necessary. The same applies to the power connections 1N at the common connection point 9. The energy storage modules comprise one or more power connections 1N which, in this embodiment, are connected via a common connection point 9 for connection to the power supply grid(s) 5, 61, 62. Via the connection point, the non-localized control and system tasks NORS in the non-local power supply grid 5 and the localized control and system tasks ORS in the local power supply grids 61, 62 can be carried out by energy absorption En from and energy release Ep to the connected power supply grid(s) 5, 61, 62. To split the energy flow into separate energy flows to the separate power supply grids 5, 61, 62 at the connection point, the energy storage system 1 comprises a regulating unit 12 which is described in detail in FIG. 8. As a result, the complete system storage capacity SK and the system output L can be used for energy absorption En from and energy release Ep to the one or more power supply grids 5, 61, 62 that is/are connected to the energy storage system 1. In an energy storage system 1 that is only connected to a local power supply grid 61, 62 connected to the non-local power supply grid 5, the regulating unit comprises at least one circuit breaker. In this case, it is not necessary to split the energy flows because the complete energy flow EF ends in the local power supply grid 5. The master module 2M is configured for overall control of all energy storage modules 2M, 2S that are connected to the data line 3 and, to achieve this, comprises at least one interface 4M for receiving EM external control commands ESB regarding the localized and non-localized control and system tasks ORS, NORS to be carried out and a master control unit 7M for storing S and carrying out AO, ANO the external control commands ESB. Herein, the master control unit 7M has the module storage capacities MSK and module outputs ML of all of the energy storage modules 2M, 2S connected to it and carries out ANO the non-localized control and system tasks NORS only within the scope of the portions SKg, Lg of the system storage capacities SK and/or system output L that are not required for the localized control and system tasks ORS. To achieve this, the master control unit comprises a priority management unit 71 for carrying out AO, ANO the individual external control commands ESB, wherein carrying out AO the external control commands ESB regarding localized control and system tasks ORS in the local power supply grid(s) 61, 62 has priority over carrying out ANO the external control commands ESB regarding non-localized control and system tasks NORS in the non-local power supply grid 5. This priority management unit 71 is, for example, designed as a data memory with a priority hierarchy stored therefrom. The priority hierarchy can be available in the form of a file which can, for example, be replaced or modified on site. In one embodiment, it is provided that, for system safety reasons, it is not possible to access the priority management unit 71 via the interface 4M. In this embodiment, the slave modules 2S each comprise a slave control unit 7S which monitors and controls the operating states BZ of the respective slave module 2S and transmits the operating data BD of the slave module 2S to the master module 2M via the data line 3. Here, the slave modules 2S are jointly controlled by the master control unit 7M by the latter instructing the slave control units 7S to carry out the control and system tasks ORS, NORS and the individual slave control units 7S implementing the instructions into corresponding machine parameters for the flywheel energy storage units 8. Alternatively, the slave control units 7S can be done without and all of their functions can also be executed by the master control unit 7M. The control is effected in that the master control unit 7M tells the individual energy storage modules 2M, 2S how much energy should be released from the flywheel energy storage units 8 by means of deceleration or be absorbed in the individual flywheel energy storage units 8 by means of acceleration. In order to ensure that this energy absorption or release can be achieved as desired, the slave control units 2S thereupon control the drive motors of the flywheel energy storage units 8 such that they decelerate or accelerate the individual flywheel energy storage units 8. In this embodiment, a slave module 2S also comprises an interface 4S for receiving EM external control commands ESB regarding the localized and non-localized control and system tasks ORS, NORS to be carried out, wherein, in the event of a failure of the present master module 2M or the present master control unit 7M, the slave control unit 7S is configured to store S the external control commands ESB and to control AO, ANO the other slave modules 2S as new master control unit 7M-N.

For reasons of system security, the master module 2M, here, additionally comprises a first test unit 10 which checks the external control commands ESB received via the interface 4M for plausibility and/or origin and transmits to the master control unit 7M a positive PP or negative NP first test result PE1 before the master control unit 7M stores S the received external control commands ESB. This prevents unauthorized persons from being able to access the energy storage system 1 from outside and produce undesired operating states. Furthermore, the master module 2M of the illustrated instance comprises a second test unit PE2 which checks the operating data BD transmitted by the slave modules 2S for plausibility and/or origin and transmits to the master control unit 7M a positive PP or negative NP second test result PE2 before the master control unit 7M stores S the transmitted operating data BD. The two test units allow effectively preventing any unauthorized access via the interface and the internal data communication. Therein, the control and system tasks can be stored S in a task memory 15 which the master control unit 7M can access via the data connection in order to control the energy storage system 1 according to the non-localized and localized control or system tasks NORS, ORS. Therein, the master control unit 7M can access the task memory 15 at periodic intervals, for example, within a range of milliseconds or after each storage S to the task memory 15, in order to register possibly new localized and/or non-localized control and system tasks ORS, NORS. If the first and/or second test result PE1, PE2 is/are negative NP, the master control unit 7M sends out an alarm signal AS.

With the connection to the outside being established, the master control unit 7M is configured to send the operating data BD of the energy storage system 1 which it registered and evaluated beforehand to the outside via the interface 4M in a reporting protocol MP that comprises these operating data BD, in order that the operating data BD can be taken into account at least for the external control commands ESB to be received.

Furthermore, the master module comprises one or more measuring units 14 for measuring single or multiple relevant data RD (dashed arrows) in the respective connected local and non-local power supply grid 5, 61, 62. Therein, the master control unit 7M is provided to control AO, ANO the energy storage system 1 for the localized and non-localized control and system tasks ORS, NORS in the local and non-local power supply grids 5, 61, 62 based on the relevant data RD that have been measured. Based on the relevant data RD thus measured and therefore available in the energy storage unit 1, the master control unit 7M, after having evaluated the relevant data RD and having them compared with the provided localized and non-localized control and system tasks ORS, NORS, can control the local energy storage system 1 for the localized and non-localized control and system tasks ORS, NORS in these local and non-local power supply grids 5, 61, 62 in a target-oriented and flexible manner, in order to control the grid quality.

Figure 2:
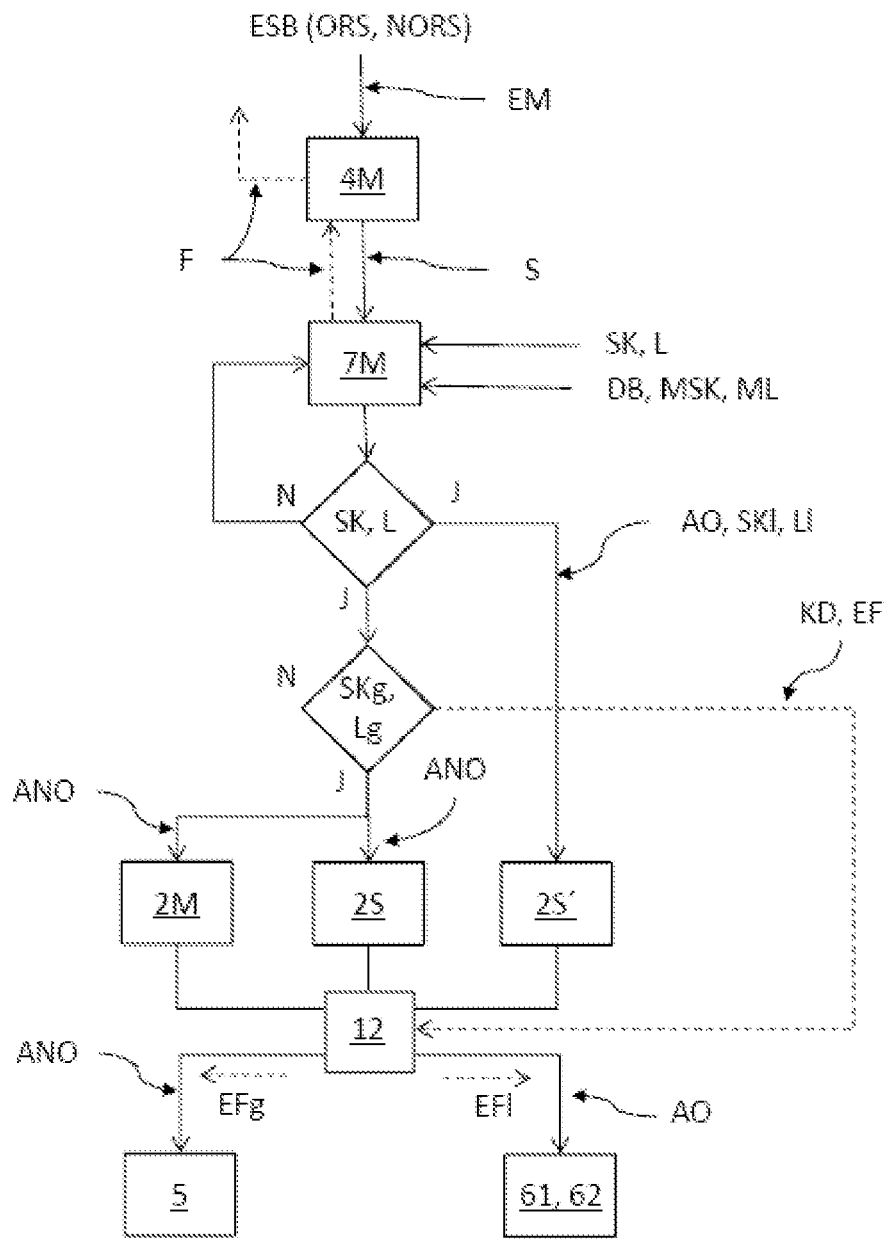
FIG. 2 shows an exemplary embodiment of a method for operating the energy storage system according to the invention.

FIG. 2 shows an exemplary embodiment of a method for operating the energy storage system according to the invention 1. The energy storage system 1 receives EM external control commands ESB regarding non-localized and/or localized control and system tasks NORS, ORS via an interface 4M and stores S the received control commands. Based on the received localized and non-localized control and system tasks ORS, NORS, the master control unit 7M checks the feasibility of the received localized and non-localized control and system tasks within the scope of the system storage capacity SK and the system output L of the energy storage system 1 as well as that of the operating data BD transmitted by the slave modules 2S and of the respective module storage capacities MSK and module outputs ML. If they can be carried out, the localized control and system tasks ORS are carried out by a preferential control AO, for example, by the slave module 2S' in the connected local power supply grid 61, 62 using the required local system capacity SKl and a local system output Ll. The non-localized control and system tasks NORS are also checked for their general feasibility within the scope of the system storage capacity SK and system output L. If it is generally not possible to carry out the received non-localized control and system tasks NORS because they exceed the scope of the energy storage system 1, the master control unit 7M will send out a corresponding fault signal F via the interface 4M and block these non-localized control and system tasks NORS so that they cannot be carried out again. Since the localized control and system tasks ORS are carried out, nothing but the non-local system capacity SKg and system output Lg that are not required for the localized control and system tasks ORS are available for the non-localized control and system tasks NORS. Even if non-localized control and system tasks NORS can, in principle, be carried out by the energy storage system 1, it is now checked whether these tasks can in fact be carried out within the scope of the free non-local capacities SKg and free non-local outputs Lg. If the check shows that it is currently not possible to carry out the non-localized control and system tasks NORS, these tasks are shelved for being carried out by the master control unit 7M and, for example, appropriately labeled in the task memory 15. If the check shows that it is currently possible to carry out the non-localized control and system tasks NORS, the master control unit 7M controls ANO the energy storage system 1 such that the non-localized control and system tasks NORS can be fulfilled (carried out) in the connected non-local power supply grid 5. Therein, the master control unit 7M can split the partial tasks for carrying out AO, ANO the control and system tasks ORS, NORS among the slave modules 2S in a suitable manner. In the illustrated instance, for example, the master module 2M and the slave module 2S are assigned to carry out ANO the non-localized control and system tasks NORS while the other slave module 2S' causes the localized control and system tasks ORS to be carried out AO. To achieve this, the regulating unit 12 receives the appropriate configuration data for the regulating function KD from the control unit 13 via an appropriate data connection 31, said configuration data acting as instructions on the control and splitting of the energy flow EF into an energy flow EFg to/from the non-local power supply grid 5 and an energy flow EFl to/from the local power supply grid 61.

Figure 3:
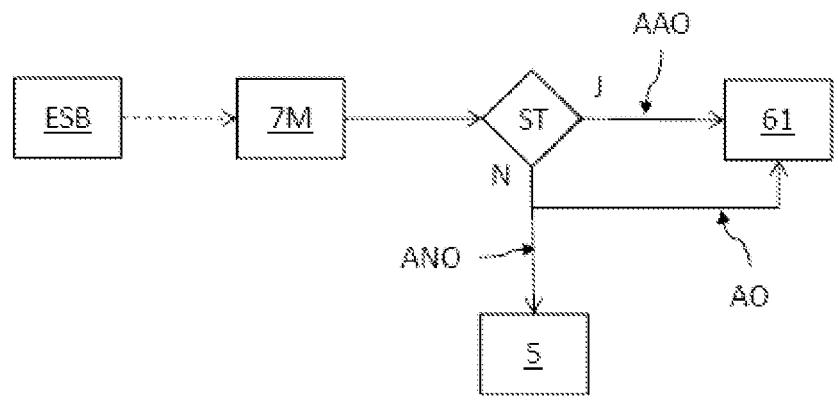
FIG. 3 shows an exemplary embodiment of the method according to the invention in the event of disturbed reception of the external control commands.

FIG. 3 shows an exemplary embodiment of the method according to the invention in the event of disturbed reception EM of external control commands ESB. With the communication connection being established, external control commands ESB were transmitted to the energy storage system 1 and received and stored in the task memory 15 by the latter. If the local master control unit 7M now accesses the task memory 15, it is therein also checked ST whether the energy storage system 1 is still connected to the outside or whether reception from the outside is disturbed ST. If the check shows that there is no disturbance ("N"), for example, by an aforementioned handshake with transmission of a handshake signal HS and reception of a corresponding return signal RS, the energy storage system 1 will, with priority, carry out AO the localized control and system tasks ORS for the connected local power supply grid 61 (in the embodiment of the illustrated instance, there is only one connected power supply grid) and will also carry out ANO the non-localized control and system tasks NORS for the non-local power supply grid 5 within the scope of the free non-local capacities SKg and the free non-local outputs Lg. If the check shows that there is a disturbance ST in the connection ("J"), only the localized control and system tasks ORS are carried out AAO for the local power supply grid 61. When the communication connection is periodically checked, the check may yield a positive result at a later point, with the result that the energy storage system 1 once again simultaneously carries out the localized and non-localized control and system tasks ORS, NORS within the scope of the available capacities and outputs SK, SKg, SKl, L, Lg, LI.

Figure 4:
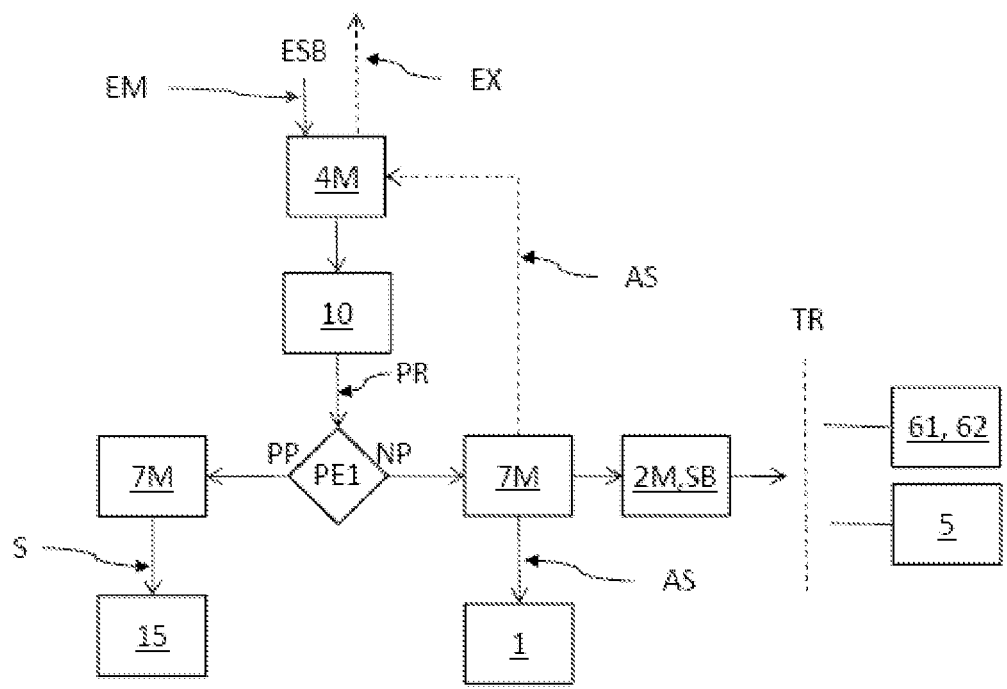
FIG. 4 shows an exemplary embodiment of a response of the energy storage system to received control and system tasks of doubtful origin and/or content.

FIG. 4 shows an exemplary embodiment of a response of the energy storage system 1 to received external control commands ESB of doubtful origin and/or doubtful content. Herein, the external control commands ESB are received by the master module 2M via the interface 4M and transferred on to the first test unit 10. There, the received external control commands ESB are checked PR for plausibility and origin. To achieve this, the first test unit 10 comprises an appropriate test program which is automatically applied to every received localized or non-localized control and system task ORS, NORS. If the first test result PE1 is positive PP (PE1=PP), the received control commands ESB are stored S in the task memory 15 of the master module 2M. The control and system tasks ORS, NORS that are allowed to be stored S can, for example, be appropriately indexed by the test unit 10 (for example, a set bit or any other marker). In this case, the task memory 15 stores only those control and system tasks ORS, NORS that are indexed accordingly. Alternatively, the first test unit 10 can also transfer only those control and system tasks ORS, NORS that have been tested positively PP to the task memory 15. In this case, the control and system tasks ORS, NORS do not have to be marked or indexed because control and system tasks ORS, NORS that have been tested negatively are not transferred by the first test unit 10 and, therefore, the task memory 15 does not have to assume the task of detecting the test result PE1. In a further alternative embodiment, the first test unit 10 can file the tested control and system tasks ORS, NORS in a buffer, for example, in the first test unit 10 and send to the task memory 15 a data list of the positively PP tested control and system tasks ORS, NORS, whereupon the task memory 15 automatically downloads the positively PP tested control and system tasks ORS, NORS from the buffer and stores S them in the task memory 15. To carry out the localized and non-localized control and system tasks ORS. NORS stored in the task memory 15, the master control unit 7M can access them via a data connection. The stored localized control and system tasks ORS are carried out simultaneously with but preferably prior to the non-localized control and system tasks NORS. It is always possible to carry out the tasks simultaneously provided both control and system tasks ORS, NORS can be carried out within the scope of the system storage capacity and the system output. If this is not the case, the localized control and system tasks ORS are carried out with priority. If, in contrast, the test result PE is negative (PE=N), the master control unit 7M sends out an alarm signal AS to the energy storage system 1 (and/or to the outside EX via the interface 4M) and the master control unit 7M is prompted to disconnect TR the energy storage system 1 from the connected power supply grids 5, 61, 62. This completed disconnection TR is schematically indicated by the dashed vertical line between the regulating unit 16 and the power supply grids 5, 61, 62.

Figure 5:
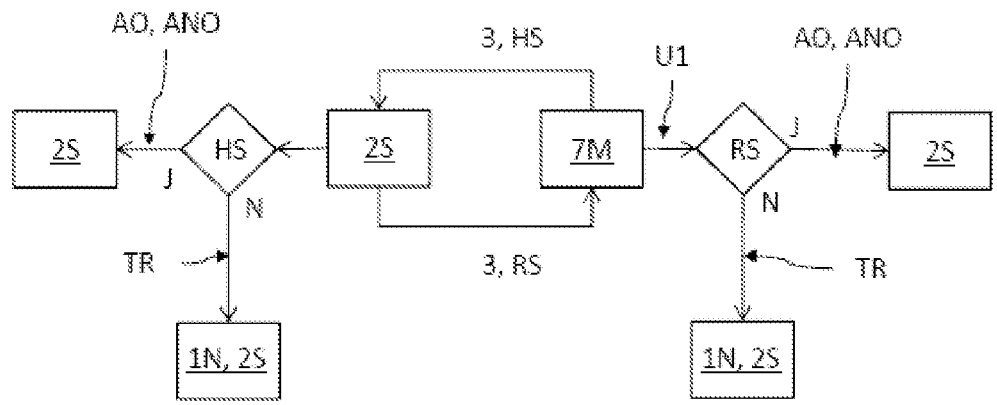
FIG. 5 shows an exemplary embodiment of the method according to the invention in the event of disturbed communication with the slave modules.

FIG. 5 shows an exemplary embodiment of the method according to the invention in the event of disturbed communication with the slave modules 2S. In the illustrated instance, the master control unit 7M periodically checks U1 the data line 3 running to the slave modules 2S for their functional efficiency by means of a so-called handshake signal HS sent to the slave modules 2S whereupon, based on the received handshake signal HS, the slave modules 2S transmit a return signal RS that is characteristic of the respective slave module 2S to the master control unit 7M. The master control unit 7M is provided to ascertain the functional efficiency of the data line 3 running to the respective slave modules 2S based on the received return signal RS. Once it receives the return signal RS, the master control unit 7M carries out AO, ANO the control and system tasks ORS, NORS via the slave modules 2S. If the master control unit 7M does not receive a return signal from one or all of the slave modules 2S, the power connections 1N of the particular slave module 2S or all power connections 1N going to the connected power supply grids are disconnected TR from the master control unit 7M. If, in contrast, the slave module 2S does not receive a handshake signal HS from the master control unit 7M, the slave module 2S disconnects TR the power connections 1N of the slave module 2S from the respective connected power supply grids 5, 61, 62. Here, for example, the disconnection can be achieved by breaking the connection to the connection point 9.

Figure 6:
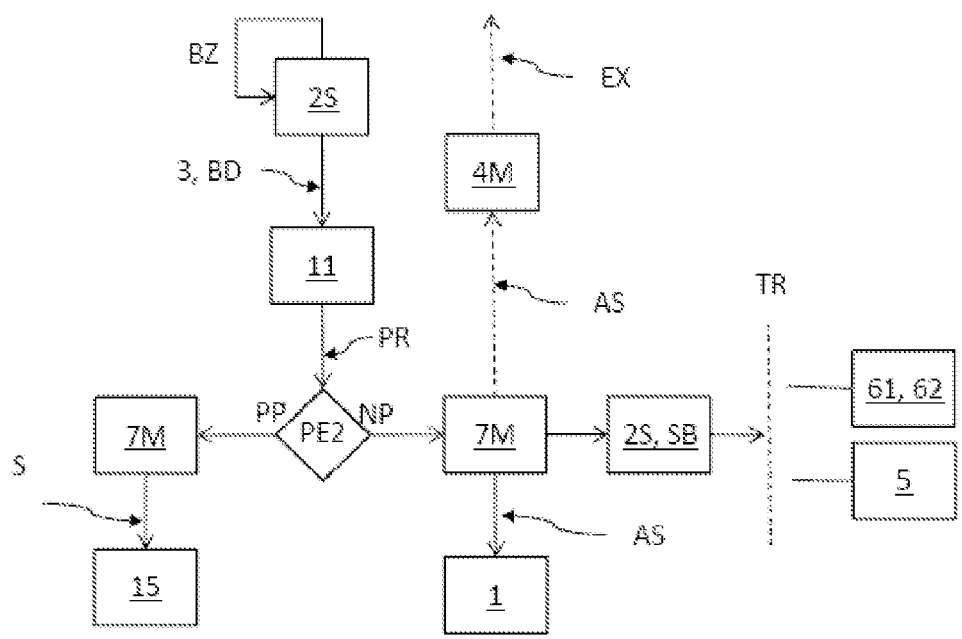
FIG. 6 shows an exemplary embodiment of a response of the energy storage system to received operating data of doubtful origin and/or content.

FIG. 6 shows an exemplary embodiment of a response of the energy storage system to received operating data BD of doubtful origin and/or content. The slave modules 2S or, rather, their slave control units 7S continuously monitor the operating states BZ of the respective slave module 2S and transmit to the master module 2M or, rather, the master control unit 7M the operating data BD of the slave module 2S via the data line 3, said operating data BD comprising the module storage capacity MSK and module output ML not required for the localized control and system tasks ORS. In the second test unit 11 of the master module, the operating data BD transmitted by the slave modules 2S are now checked for plausibility and/or origin. If the second test result PE2 is positive PP, the master control unit 7M stores the transmitted operating data BD to a task memory 15. If, however, the second test result PE2 is negative, the master module 7M switches the respective slave module 2S into a safe operating state SB; in the illustrated instance, the master control unit 7M disconnects TR the power connections 1N of this slave module 2S from the connected power supply grids 5, 61, 62 and transmits an alarm signal AS to the energy storage system 1 and, via the interface 4M, to the outside EX. For the purpose of grid disconnection, the master control unit 7M is connected to the power connections 1N of the slave modules in a switchable manner.

Figure 7:
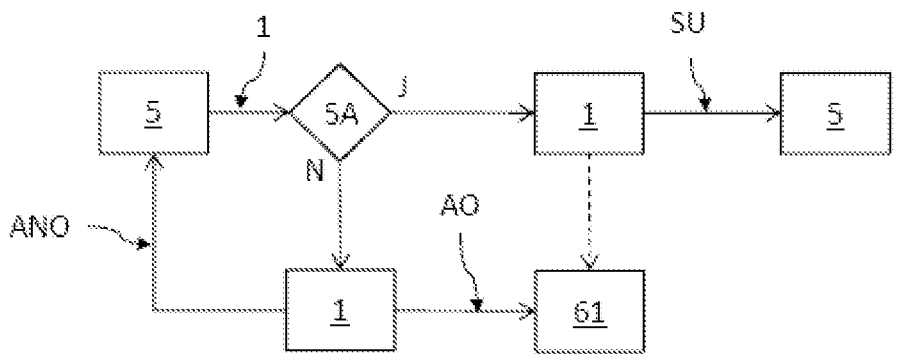
FIG. 7 shows an exemplary embodiment of a black start supporting unit with an energy storage system according to the invention.

FIG. 7 shows an exemplary embodiment of the method according to the invention in the event of a failure 5A of the non-local power supply grid 5. In this exemplary embodiment, the energy storage system 1 is ready for a black start supporting unit SU, if the non-local power supply grid 5 fails 5A. The energy storage system 1 continuously checks whether the non-local power supply grid 5 is present, for example, via the appropriate regulating unit 12. If the check shows that the non-local power supply grid 5 is present (5A=N), the energy storage systems 1 are continued to be operated in normal operating mode, as shown in FIG. 1, with the result that the energy storage systems 1 are controlled AO, ANO according to the localized and non-localized control and system tasks ORS, NORS. If the check shows that the non-local power supply grid 5 has failed (5A=J), the black start supporting unit SU for the non-local power supply grid 5 is given priority over the localized control and system tasks ORS (indicated by the dashed arrow pointing to the local power supply grid 61). The energy storage system 1 will carry out a black start for the non-local power supply grid 5 after or, given the appropriate synchronization of the feed-in frequency, together with other energy storage systems or power stations. Once black start has been completed successfully, the localized control and system tasks ORS are once again carried out with priority.

Figure 8:
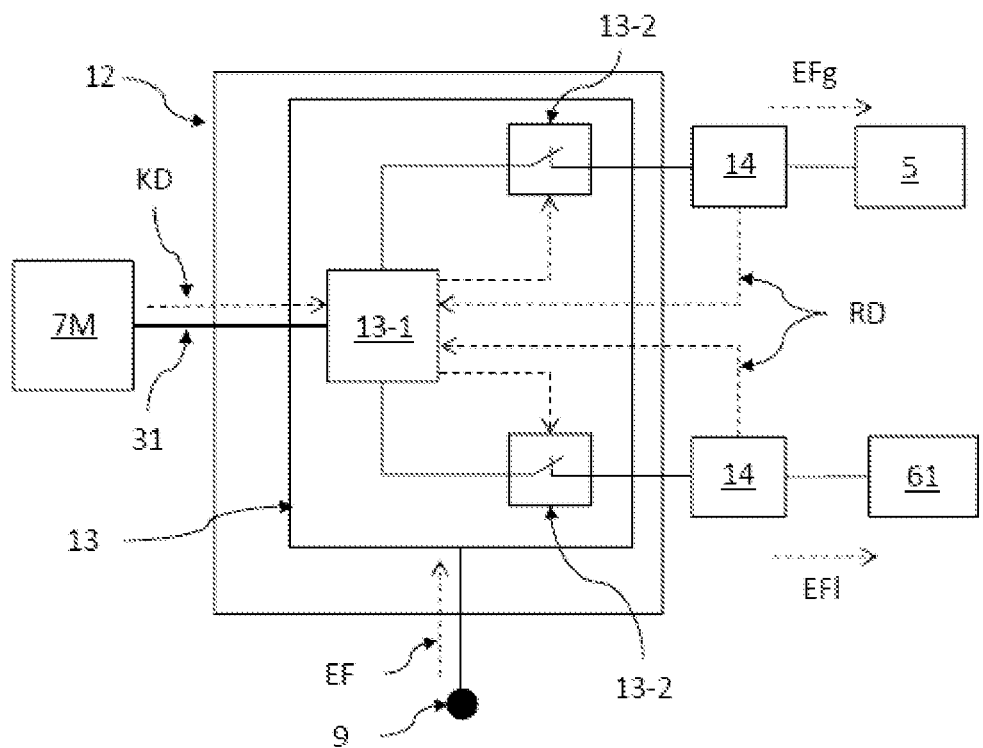
FIG. 8 shows an exemplary embodiment of the regulating unit with a regulating box.

FIG. 8 shows an exemplary embodiment of the regulating unit 12 which, in the illustrated instance, is connected to a local power supply grid 61 and to a non-local power supply grid 5. In order that the regulating unit 12 can regulate the energy flow EF between the connected power supply grids 5, 61 and the energy storage system 1 and, if necessary, disconnect the one or more connected power supply grids, i.e. the local power supply grid 61 and/or the non-local power supply grid 5 in the illustrated instance, from the local energy storage system 1, the regulating unit 12 according to this embodiment comprises a regulating box 13 having a control element 13-1 and separate circuit breakers 13-2 for each of the connected power supply grids 5, 61. The master control unit 7M is connected to the control element 13-1 of the regulating box 13 via a data connection 31 and transmits appropriate configuration data of the regulating function KD to the regulating box 13, i.e. the control box 13-1 in the illustrated instance, for controlling the energy flows. Based on the configuration data of the regulating function KD, the control element 13-1 controls the splitting of the energy flow EF coming in from the connection point 9 to the connected power supply grids 5, 61 into the energy flow EFl for the local power supply grid 61 and the energy flow EFg for the non-local power supply grid 5. In this exemplary embodiment, the distribution of the energy flow EF is shown when energy is fed into both connected power supply grids 5, 61 by way of example only. Similarly, the regulating box 13 is configured to control an energy flow from one of the connected power supply grids 5, 61 and an energy flow to the other one of the connected power supply grids 61, 5 wherein, depending on the size of the two energy flows, either the negative energy excess of the energy storage system 1 is stored or the positive energy excess of the energy storage system 1 is provided. In the illustrated instance, the energy storage system 1 is not shown explicitly but only symbolically through the corresponding components 7M, 12, 14. The regulating box 13 simultaneously receives the relevant data RD of the two connected power supply grids 5, 61 from corresponding measuring units 14 wherein, based on said relevant data RD, the control element 13-1 derives the presence of the two connected power supply grids 5, 61 by means of criteria or threshold values for the relevant data RD that are filed in the control element 13-1. If one of either of the connected power supply grids 5, 61 is no longer available because of a grid failure, the failure of the particular power supply grid 5, 61 manifests itself in the corresponding relevant data RD transmitted to the control element 13-1, whereupon the control element 13-1 automatically sends appropriate disconnection instructions (dashed arrow) to the respective circuit breaker(s) 13-2 for disconnection of the energy storage system 1 from the connected power supply grid(s) 5, 61, whereupon the circuit breaker(s) 13-2 disconnect(s) the previously connected power supply grid(s) 5, 61 from the energy storage system 1. Therein, the connected power supply grid is disconnected within a few milliseconds. If only one power supply grid is disconnected, the energy storage system 1 continues to be ready for the other still connected power supply grids. As a result, a short-circuit or overload situation can effectively be prevented in the event of a power supply grid. The exemplary embodiment shown here with a connected local power supply grid 61 and a connected non-local power supply grid 5 is only an example for two connected power supply grids. In other embodiments, the regulating unit 16, more particularly the regulating box 13, can also be connected to more than two power supply grids. The two or more connected power supply grids can also each be local power supply grids out of which at least one of the local power supply grids is connected to the non-local power supply grid for carrying out the non-localized control and system tasks.

The embodiments shown here represent only examples of the present invention and may therefore not be understood to be limiting. Alternative embodiments that can be contemplated by the person skilled in the art are likewise included in the scope of the present invention.

LIST OF REFERENCE SYMBOLS

1 Energy storage system according to the invention
1N Power connections of the individual energy storage modules or of the energy storage system
2M Energy storage module as master module
2S, 2S' Energy storage modules as slave modules
3 Data line
31 Data connection
4M Interfaces of the master module for receiving external control commands
4S Interfaces of the slave module for receiving external control commands
5 Non-local power supply grid
5A Failure of the non-local power supply grid
61, 62 Local power supply grid
7M Master control unit of the master module
7S Slave control unit of the slave module
71 Priority management unit
8 Flywheel energy storage unit
9 Connection point
10 First test unit
11 Second test unit
12 Regulating unit for connecting the energy storage system to the power supply grids
13 Regulating box
13-1 Control element
13-2 Circuit breaker
14 Measuring unit of the energy storage system
15 Memory for the external control commands
A1N Connecting the energy storage modules to the power supply grid(s)
AAO Exclusively carrying out the particular localized control and system tasks
ANO Carrying out the external control commands/controlling the energy storage system/energy storage modules regarding the non-localized control and system tasks
AO Carrying out the external control commands/controlling the energy storage system/energy storage modules regarding the localized control and system tasks
AS Alarm signal
BD Operating data of the energy storage modules
EF Energy flow
EFg Energy flow to the non-local power supply grid
EFl Energy flow to the local power supply grid
EM Receiving external control commands
En Absorption of energy from the power supply grid by the energy storage system (provision of negative energy)
Ep Release of energy to the power supply grid by the energy storage system (provision of positive energy)
ESB External control commands EX To the outside
F Fault signal
FT Checking the functional efficiency of the data line/ascertaining the functional efficiency
HF Hierarchy of control in the power interconnection or in the regional interconnection
HS Handshake signal
KD Configuration data of the regulating function
L System output of the energy storage system (total output)
Lg System output available for the non-localized control and system tasks (non-local output)
LI System output provided for the localized control and system tasks (local output)
ML Module output
MSK Module storage capacity
NP Negative test result
NORS Non-localized control and system tasks
ORS Localized control and system tasks
PP Positive test result
PE1 First test result
PE2 Second test result
PR Checking the received NORS, ORS
RD Relevant data of the local power supply grid
RS Return signal in response to the handshake signal
S Storing data
SB Safe operating state
SK System storage capacity of the energy storage system (total capacity)
SKg System storage capacity available for the non-localized control and system tasks (non-local capacity)
SKl System storage capacity provided for the localized control and system tasks (local capacity)
ST Disturbed reception of the external control commands
SU Black start supporting unit
TR Disconnecting the energy storage system from the connected power supply grids
U1 Checking the reception of the return signal
Z The master control unit accessing the task memory

The invention claimed is:

1. An energy storage system having a system storage capacity and/or system output and having more than one energy storage modules each having a module storage capacity and a module output,
  said energy storage modules featuring power connections at least for connection to a non-local power supply grid for carrying out non-localized control and system tasks in the non-local power supply grid,
    wherein the non-localized control and system tasks comprise a provision of primary and secondary reserve power, to support a black start, a general storage of power peaks and a reactive power compensation in the non-local power supply grid and wherein the non-local power supply grid is a transmission network,
  and/or for connection to one or more local power supply grid(s) for carrying out localized control and system tasks in the local power supply grid(s)
  wherein the localized control and system tasks improve a present local grid quality and wherein the local power supply grid is a power supply grid delimited in space comprising an in-house power sully system on a facility site, a power supply system inside a building or a complex of buildings, by absorbing energy from and releasing energy to the connected power supply grids and
  said energy storage modules of the energy storage system being connected to each other via one or more data lines, wherein one of the energy storage modules is provided as master module comprising a task memory to store external control commands regarding the non-localized and localized control and system tasks to be carried, and the other energy storage modules are provided as slave modules and the master module is designed for the overall control of all energy storage modules connected to the data line, and
  at least the master module further comprises at least one interface for receiving the external control commands and a master control unit as a component of the master module for storing and carrying out the external control commands by accessing the task memory via a data connection between the master control unit and the task memory,
  wherein the master control unit is provided to dispose of the module storage capacities and module outputs of all of the energy storage modules connected to it and to carry out the non-localized control and system tasks only within the scope of those portions of the free system storage capacities and the system output that are not required for the localized control and system tasks,
  wherein in the event of disturbed reception of the external control commands, the master control unit is provided to dispose of the module storage capacities and module outputs of all of the energy storage modules connected to it only available for carrying out the control commands regarding the localized control and systems tasks to be carried out in the connected local power supply grid(s) until the reception of external control commands has been restored.

2. The energy storage system according to claim 1, characterized in that the power connections of the master module and the slave modules have a common connection point for connection to the power supply grids.

3. The energy storage system according to claim 1, characterized in that at least the master control unit comprises a priority management unit implemented as a data memory for carrying out the individual external control commands, wherein carrying out the external control commands regarding localized control and system tasks in the local power supply grid(s) has priority over carrying out the external control commands regarding non-localized control and system tasks in the transmission network.

4. The energy storage system according to claim 1, characterized in that the master module comprises a first test unit comprising and executing an appropriate test program to check the received external control commands for plausibility and origin and to transmit to the master control unit a positive or negative first test result before the master control unit stores the received external control commands.

5. The energy storage system according to claim 1, characterized in that the slave modules each comprise slave control units which are designed
  to monitor and control operating states of the respective slave module, and
  to transmit to the master module operating data of the slave module via the data line, said operating data comprising the module storage capacity and module output not required for the localized control and system tasks.

6. The energy storage system according to claim 5, characterized in that the master module comprises a second test unit being connected to the master control unit, which is provided
  to check the operating data transmitted by the slave modules for plausibility and origin, and to transmit to the master control unit a positive or negative second test result before the master control unit stores the transmitted operating data.

7. The energy storage system according to claim 6, characterized in that the master control unit is provided
to switch a specific slave module into a safe operating state if the second test result for the transmitted operating data of that slave module is negative,
to disconnect the power connections of this slave module from the connected power supply grids via appropriate data connections, where the power connections of the slave modules are designed such that the power connection can be switched electronically, and
to send out an alarm signal to the energy storage system and/or to the outside via the interface.

8. The energy storage system according to claim 5, characterized in that the slave module also comprises an interface for receiving external control commands regarding the localized and non-localized control and system tasks to be carried out and, in the event of a failure of the present master module or the present master control unit, the slave control unit is configured to store the external control commands and to control the other slave modules as new master control unit.

9. The energy storage system according to claim 5, characterized in that the master control unit is provided to establish a hierarchy according to which the slave control units assume the task of controlling the other slave modules in the event of a failure of the present master module or the present master control unit and to transmit said hierarchy to the slave modules.

10. The energy storage system according to claim 1, characterized in that at least the master control unit periodically checks the data line running to the slave modules for their functional efficiency by means of a so-called handshake signal that is sent to the slave modules, and
the slave modules are provided to transmit to the master control unit on the basis of the received handshake signal a return signal that is characteristic of the respective slave module,
and the master control unit is provided to ascertain the functional efficiency of the data line running to the respective slave modules based on the received return signal.

11. The energy storage system according to claim 10, characterized in that the master module is provided to disconnect at least the power connections of the master module from the respective power supply grids in case the data line running to all slave modules lacks functional efficiency, wherein the master control unit is connected to each power connection of each slave module via appropriate data connections, where the power connections of the slave modules are designed such that the power connection can be switched electronically.

12. The energy storage system according to claim 11, characterized in that the slave module is provided to disconnect the power connections of the slave module from the respective power supply grids in case the handshake signal fails to be received.

13. The energy storage system according to claim 1, characterized in that the energy storage module comprises one or more flywheel energy storage units for reversible storage of energy.

14. The energy storage system according to claim 1, characterized in that the one or more data lines are established by a data bus system.

15. A master module that is adapted to be used in an energy storage system, having a system storage capacity and/or system output,
wherein the master module has a module storage capacity and a module output and is configured with power connections at least for connection to a non-local power supply grid for carrying out non-localized control and system tasks in the non-local power supply grid,
wherein the non-localized control and system tasks comprise a provision of primary and secondary reserve power, to support a black start, a general storage of power peaks and a reactive power compensation in the non-local power supply grid and wherein the non-local power supply grid is a transmission network,
and for connection to one or more local power supply grid(s) for carrying out localized control and system tasks in the local supply network(s)
wherein the localized control and system tasks improve a present local grid quality and
wherein the local power supply grid is a power supply grid delimited in space comprising an in-house power sully system on a facility site, a power supply system inside a building or a complex of buildings, by absorbing energy from and releasing energy to the connected power supply grids, said master module comprising an interface for receiving external control commands regarding the localized and non-localized control and system tasks to be carried out and being provided to be connected to other energy storage modules via one or more data lines, and said master module further comprising a task memory to store the external control commands and a master control unit as a component of the master module for storing and carrying out the external control commands by accessing the task memory via a data connection between the master control unit and the task memory, wherein said master control unit is provided to dispose of the module storage capacities and module outputs of all of the energy storage modules connected to it and to carry out the non-localized control and system tasks only within the scope of those portions of the free system storage capacities and system output that are not required for the localized control and system tasks,
wherein in the event of disturbed reception of the external control commands, the master control unit is provided to have the module storage capacities and module outputs of all of the energy storage modules connected to it only available for carrying out the control commands regarding the localized control and systems tasks to be carried out in the connected local power supply grid(s) until the reception of external control commands has been restored.

16. A method for operating an energy storage system, having a system storage capacity and system output and having more than one energy storage modules that are connected via one or more data lines, said energy storage modules each having a module storage capacity and a module output and each featuring one or more power connections for connection power supply grids, comprising the following steps:
connecting the respective energy storage modules comprising a master module and one or more slave modules to a non-local power supply grid for carrying out non-localized control and system tasks in the non-local power supply grid, wherein the non-localized control and system tasks comprise a provision of primary and secondary reserve power, to support a black start, a general storage of power peaks and a reactive power compensation in the non-local power supply grid and wherein the non-local power supply grid is a transmission network, and to one or more local power supply grids for carrying out localized control and system tasks in the local power supply grid(s)

wherein the localized control and system tasks improve a present local grid quality and wherein the local power supply grid is a power supply grid delimited in space comprising an in-house power sully system on a facility site, a power supply system inside a building or a complex of buildings, by absorbing energy from and releasing energy to the connected power supply grids;

receiving external control commands regarding the localized and non-localized control and system tasks to be carried out by means of an appropriately configured interface of the master module comprising a task memory to store the external commands;

storing and carrying out the external control commands by means of a master control unit as a component of the master module by accessing the task memory via a data connection between the master control unit and the task memory, wherein the master control unit disposes of the module storage capacities and module outputs of all of the energy storage modules connected to it;

carrying out the non-localized control and system tasks only within the scope of those portions of the free system storage capacities and system output that are not required for the localized control and system tasks, wherein in the event of disturbed reception of the external control commands, the master control unit is provided to have the module storage capacities and module outputs of all of the energy storage modules connected to it only available for carrying out the control commands regarding the localized control and systems tasks to be carried out in the connected local power supply grid(s) until the reception of external control commands has been restored.

* * * * *

UNITED STATES PATENT AND TRADEMARK OFFICE
CERTIFICATE OF CORRECTION

PATENT NO. : 9,859,711 B2
APPLICATION NO. : 14/430498
DATED : January 2, 2018
INVENTOR(S) : Rainer von dem Esche et al.

Page 1 of 1

It is certified that error appears in the above-identified patent and that said Letters Patent is hereby corrected as shown below:

Column 27, Line 41 Claim 1 reads "and/or" should read --and--

Column 27, Line 55 Claim 1 reads "and/or" should read --and--

Column 30, Line 3 Claim 15 reads "and/or" should read --and--

Signed and Sealed this
Twenty-second Day of May, 2018

Andrei Iancu
*Director of the United States Patent and Trademark Office*